3,005,748
FUNGUS COMBATING WITH FERRIC NITROSO DIMETHYL DITHIOCARBAMATE CONTAINING TETRAMETHYL THIURAMDISULFIDE
Irving Gibbs, Norwalk, Conn., assignor to R. T. Vanderbilt Company, Inc., New York, N.Y., a corporation of New York
No Drawing. Filed Apr. 20, 1959, Ser. No. 807,322
3 Claims. (Cl. 167—22)

My invention relates to compositions which are effective in combating fungus on vegetation.

This application is a continuation-in-part of my copending application Serial No. 447,891, filed August 4, 1954, now abandoned.

In the selection of a suitable fungicide it is necessary to obtain a balance between various requirements dictated by the particular use and field of application, and the limitations of the materials available for use. Most compounds of course do not have sufficient fungicidal effect and hence are not adaptable for use at all. Many compounds although effective in killing fungus also have a pronounced phytotoxic action on the vegetation and therefore are not suitable, or if used the amounts must be carefully controlled. Other compounds, although they may have fungicidal effect without pronounced phytotoxic properties, may have other disagreeable properties such as toxicity to humans, corrosiveness, etc. Still another important factor to be taken into consideration is the appearance of the fungicide on the vegetation. Some materials, particularly those that are dark in color, produce an unsightly effect on the vegetation and in some cases mask out sunlight which is necessary for the growth and the health of the plant.

In accordance with my present invention, I have discovered that the compound ferric nitroso dimethyl dithiocarbamate of the fromula:

$$[(CH_3)_2NC(S)S]_2FeNO$$

(when mixed with a small amount of tetramethyl thiuramdisulfide, a known fungicidal material in amount to make the composition satisfactorily fungicidal) possesses superior fungicidal properties to many similar fungicides and has a green color which does not cause discoloration to the plants and trees to which it is applied. Ferric nitroso dimethyl dithiocarbamate is a known compound. when it is made by the procedure described in my copending application (reacting a dimethyl dithiocarbamate with an iron salt and nitric oxide (NO) in acid liquid medium to form a slurry of ferric nitroso dimethyl dithiocarbamate in the liquid medium, neutralizing the excess acid in the slurry, filtering the solids from the liquid and washing the solids to remove soluble impurities), the product always contains a minor proportion of tetramethyl thiuramdisulfide, e.g., about 30% based on the weight of the ferric nitroso dimethyl dithiocarbamate. Such amounts of tetramethyl thiuramdisulfide are effective in promoting the fungicidal properties of the ferric nitroso dimethyl dithiocarbamate.

The nitric oxide will usually be generated in the system by a reaction between a nitrite salt such as sodium nitrite and an acid such as sulfuric acid. The amount of acid in the system should preferably be such as to effect a pH in the range of 5 to 6 during the reaction between the dimethyl dithiocarbamate, the iron salt and the nitric oxide. Furthermore, it is known that nitrous acid, which is formed by the reaction between the nitrite and the sulfuric acid, will decompose into nitric oxide or into other products depending upon the conditions prevailing in the system, for example, the temperature of the liquid medium and the concentration of the reactants. Accordingly, for the purpose of the present invention those conditions are maintained that bring about the formation of nitric oxide.

As a source of the iron salt I preferably use a soluble ferrous salt such as hydrated ferrous sulfate. However, other soluble ferrous salts can be used if desired.

The dimethyl dithiocarbamate will usually be added in the form of the sodium salt. This can be made in the known manner of reacting stoichiometric amounts of sodium hydroxide, dimethylamine and carbon disulfide. In place of sodium dimethyl dithiocarbamate there can be used potassium dimethyl dithiocarbamate or other water soluble salts of dimethyl dithiocarbamic acid.

In one type of procedure for preparing the ferric nitroso dimethyl dithiocarbamate, a dilute solution of sodium dimethyl dithiocarbamate and sodium nitrite is prepared. In a separate vessel a solution of ferrous sulfate and sulfuric acid is prepared. The ferrous sulfate solution is added slowly with good agitation to the sodium dimethyl dithiocarbamate-sodium nitrite solution. When the addition of ferrous sulfate has been completed, determine the pH and adjust to make certain that it is between 5 and 6. After stirring for a period of time a sufficient amount of sodium hydroxide is added to neutralize the excess acid. The aqueous slurry obtained is filtered and washed until it is free of all soluble salts. The green product is dried at a temperature not exceeding 140° F. in order to reduce the hazard of combustion of the product. The dried product may be ground with Dry Ice or other suitable refrigerant to prevent darkening, loss of nitric oxide and/or spontaneous combustion.

In in alternative procedure a solution of ferrous sulfate and sulphuric acid in amount sufficient to aid in dissolving the ferrous sulfate is added slowly to an aqueous solution of sodium dimethyl dithiocarbamate (in the absence of nitrous acid). This causes the precipitation of a light brown slurry of ferrous dimethyl dithiocarbamate. The solution of sodium nitrite in water is then added to the slurry with stirring, keeping the pH between 5 and 6 at all times by adding further amounts of sulfuric acid. Stirring is then continued until the reaction is complete and sodium hydroxide is added to neutralize the excess acid. Thereafter the material is filtered, washed and dried as before. It will be seen therefore that it is possible first to effect precipitation of ferrous dimethyl dithiocarbamate and thereafter react it with the nitric oxide, or alternatively to bring about the precipitation in the presence of the nitric oxide and thereby form the ferric nitroso dimethyl dithiocarbamate in a single operating step.

It is known that the nitric oxide is more soluble in cold water and accordingly for reactions of this type temperatures somewhat lower than room temperature, i.e., 32° F. to 60° F. are frequently employed. For the purpose of convenience, however, it may be preferred to maintain the reaction system at room temperature and such operation is satisfactory for producing the desired product.

Since all of the nitric oxides are generally volatile substances, there is a certain amount that may or will be lost by evaporation. Accordingly to realize optimum yields we prefer to use 10% or even more excess nitric oxide over that required by the stoichiometry of the reaction.

Still another method of preparing the ferric nitroso dimethyl dithiocarbamate is described in my copending application Serial No. 807,321 filed concurrently herewith. In that process the amount of tetramethyl thiuramdisulfide formed can be fairly well controlled and substantially reduced by suitable selection of operating conditions. However in nearly all cases the ferric nitroso dimethyl dithiocarbamate will contain a small amount of tetramethyl thiuramdisulfide.

The fungicidal properties of ferric nitroso dimethyl dithiocarbamate are induced or promoted by the presence of a small amount of tetramethyl thiuramdisulfide. We have observed that when the amount of tetramethyl thiuramdisulfide is as high as 5% based on the weight of ferric nitroso compound, prominent fungicidal properties are found. Larger amounts of the secondary components (tetramethyl compound) may be present without any serious disadvantage. However, when the amount of tetramethyl thiuramdisulfide formed in situ (as opposed to being added to the ferric nitroso compound) is greater than 20%, the material may be off color, i.e., it will have lost its desirable green coloration and/or it will darken upon aging. If the tetramethyl thiuramdisulfide is not formed in situ but is added to the ferric nitroso compound, larger amounts of the tetramethyl compound may be tolerated, i.e., as high as 30% before noticeable discoloration and/or darkening with aging will be observed. Accordingly, generally speaking we maintain the amount of tetramethyl thiuramdisulfide not greater than 30% based on the ferric nitroso compound, preferably not greater than 20%, and most preferably not greater than 15%.

The procedure described in my parent application of which the present application is a continuation-in-part is illustrated by the following examples. In all of the examples the parts and percentages are on a weight basis unless otherwise indicated.

EXAMPLE I

Solution A is prepared by admixing 15.9 grams (0.23 mole) of sodium nitrite and 146.5 grams of a 30% by weight aqueous solution of sodium dimethyl dithiocarbamate (0.30 mole of sodium dimethyl dithiocarbamate) in 1500 grams (83.3 moles) of water. Solution B is prepared by admixing 41.7 grams (0.15 mole) of ferrous sulfate ($FeSO_4 \cdot 7H_2O$) and 7.7 grams (0.077 mole) of 94% by weight sulfuric acid in 500 grams (27.77 moles) of water. Solution B is added to solution A slowly and with stirring at room temperature. The mixture is then agitated for 20 minutes after the addition and 25 ml. of sodium hydroxide (10% solution) is added to neutralize any free nitrous acid. The final pH of the slurry is 6.7. The ferric nitroso dimethyl dithiocarbamate separates in the form of a green precipitate and is filtered, washed with water and dried at 140° F. The yield of product is 49 grams and the reaction is believed to take place according to the following equations:

$$4(CH_3)_2NC(S)SNa + 2FeSO_4 + 3NaNO_2 + H_2SO_4 \rightarrow$$
$$2[(CH_3)_2NC(S)S]_2FeNO + 3Na_2SO_4 + NaNO_3 + H_2O$$

The product analyzes 45.6% by weight of $CS_2$ (46.6% theoretical), 7.8% by weight of amino nitrogen (8.59% theoretical) and 12.1% by weight total nitrogen (12.9% theoretical). The amount of tetramethyl thiuramdisulfide in the product is 30%.

In my copending application Serial No. 807,321 filed concurrently herewith, in which application I describe and claim an improved method for preparing ferric nitroso dimethyl dithiocarbamate, the reaction conditions are substantially similar to those described above with the exception that after the slurry of ferric nitroso dimethyl dithiocarbamate is formed and before it is filtered and washed, it is treated with an alkali such as sodium hydroxide to raise its pH to a value above 9.0. In this way the amount of tetramethyl thiuramdisulfide formed during the process can be materially reduced and if any needs to be incorporated in order to enhance the fungicidal properties, it can be added to the product as an admixture.

The following examples illustrate the procedure of preparing the ferric nitroso compound following the aforementioned copending application.

EXAMPLE II

The reactants are as follows:

| | Parts | Moles |
|---|---|---|
| (a) 40% sodium dimethyl dithiocarbamate | 1,100 | 3.08 |
| (b) Sodium nitrite (95%) | 175 | 2.41 |
| (c) Ferrous sulfate crystals ($FeSO_4 \cdot 7H_2O$) | 429 | 1.54 |
| (d) Sulfuric acid (96%) | 77.5 | 0.76 |
| (e) Sodium hydroxide (10%) | 300 | |

Procedure A

The sodium dimethyl dithiocarbamate is diluted to a 5% aqueous solution and the sodium nitrite is added and stirred until dissolved. In a separate tank the ferrous sulfate is added to water and then the sulfuric acid is added so that an approximately 10–15% solution is obtained. The ferrous sulfate solution is then added slowly with good agitation to the sodium dimethyl dithiocarbamate solution (77° F. reaction temperature). The pH is checked using a pH meter after stirring 10 minutes to make certain that it is between 5 and 6. The stirring is continued for 1 hour and the pH again measured. The sodium hydroxide is added in amount to bring the pH within the preferred range of 9.5 to 11.0. The amount may vary within the range from 150 to 300 parts depending upon conditions. The pH is again measured after stirring for 15 minutes. The slurry that has been formed is filtered and washed until the effluent is sulfate free as determined by observing any precipitate formed by adding barium chloride. The product is dried at 140° F., higher temperatures being preferably avoided to minimize the danger of spontaneous combustion and it may thereafter be ground with Dry Ice. A number of products were made following the foregoing procedure and they were analyzed by infra red techniques to determine the content of tetramethyl thiuramdisulfide. The amount of chloroform insoluble material present was also measured. The products were tested for fungicidal activity using a standard agar incorporation technique.

In the agar incorporation procedure the test chemical is incorporated into the agar and the agar after hardening is inoculated with *Aspergillus niger* by touching a loop of the fungus spores to the agar surface three times. The agar is then incubated at 91.4° F. for a period of 96 hours and observations are made for growth. A series of determinations (1000 p.p.m., 500 p.p.m., 300 p.p.m., 100 p.p.m.) are made for each of the test compositions and the lowest concentration in parts per million of test compound needed to inhibit growth is determined. The reaction conditions and yields, purity of product and the results of the fungicidal activity tests are presented in the table below (Tests 1, 2, and 3).

Procedure B

The following alternative method is described in my copending application for preparing ferric ntiroso dimethyl dithiocarbamate. It differs from Procedure A in that the ferrous dimethyl dithiocarbamate slurry is first prepared and to that a sodium nitrite solution, then a sulfuric acid solution to form the desired product are added. The sodium dimethyl dithiocarbamate is diluted to a concentration of 5% in one vessel. In a separate vessel the ferrous sulfate is added to water and 14 parts of sulfuric acid are added in order to obtain a 10–15% solution. The acidified ferrous sulfate solution is then added to the solution of sodium dimethyl dithiocarbamate with good agitation. A light brown slurry is obtained. The sodium nitrite as a 20% aqueous solution is added slowly to the slurry. The remaining quantity of sulfuric acid is diluted to 10% and is added slowly to the slurry, making certain that the pH stays in the range from 5–6. Stirring is continued for one hour and a dark green product is obtained. The pH is checked periodically with a pH meter and is maintained in the range 5–6. The sodium hydroxide is then added and the stirring continued for 15 minutes longer while controlling the pH within the range prescribed for Procedure A. The color generally turns to a lighter shade of green upon adding the sodium hydroxide. The slurry is filtered and washed with water until it is free of sulfate as shown by checking the filtrate with barium chloride solution. The product is dried and ground as described in Procedure A. The reaction conditions, yields and purity of products as well as the results of the fungicidal activity tests are presented in the table below (Tests 4 and 5).

PROCEDURE A

| Test No. | pH Precipitation | pH After NaOH Addition | Color Dried Product | Amount NaNO$_2$ | Tetramethyl Cpd., Percent | CHCl$_3$ Insol. | Yield [1] | Fungicidal Activity [2] |
|---|---|---|---|---|---|---|---|---|
| 1 | 6.1 | 10.7 | Green | 20% xs | 10.7 | 13.1 | 231 | 300–500 |
| 2 | 5.4 | 10.8 | do | stoichio | 11.4 | 15.6 | 220 | 300–500 |
| 3 | 5.4 | 10.3 | do | 10% xs | 12.0 | 10.1 | 243 | 300–500 |

PROCEDURE B

| 4 | 5.2 | 10.8 | Green | 10% xs | 1.8 | 17.8 | 200 | +1,000 |
| 5 [3] | 5.6 | 10.2 | do | 10% xs | 8.0 | 17.7 | 205 | 500 |

[1] Theoretical yield 250.
[2] Lowest p.p.m. to inhibit.
[3] Reaction temperature 95° F. (35° C.).

It will be noted that Test No. 4 which was carried out by Procedure B produced a product that contained only 1.8% tetramethyl thiuramdisulfide and by the same token did not exhibit any fungicidal activity. Accordingly, various amounts ranging from 5 to 20% of tetramethyl thiuramdisulfide were added to the product and thoroughly mixed therewith. The mixtures were exposed to ultraviolet radiation for 1 hour and a determination was made of the content of tetramethyl thiuramdisulfide after the exposure. Tests of fungicidal activity were also made before and after exposure to the ultraviolet radiation. The results of the experiments are summarized in the following table.

| Test No. | Percent Tetramethyl Cpd. added | Measured Content Tetramethyl Cpd. Before Ultraviolet | Measured Content Tetramethyl Cpd. After Ultraviolet | Fungicidal Activity Before Ultraviolet | Fungicidal Activity After Ultraviolet |
|---|---|---|---|---|---|
| 6 | 5 | 7.3 | 7.6 | 500 | 500 |
| 7 | 10 | | 11.6 | 500 | 500 |
| 8 | 15 | | 15.4 | 500 | 500 |
| 9 | 20 | 20.5 | 18.5 | 500 | 500 |

The manner of using the fungicide will be readily apparent to those skilled in the art. For example it can be used in the form of a wettable powder containing active ingredient, carrier and suitable surface active agents prepared in accordance with procedures used in the fungicide art. A suitable wettable powder is composed, for example, of 75% by weight of ferric nitroso dimethyl dithiocarbamate (containing the amounts of tetramethyl thiuramdisulfide specified above), 17% by weight of clay, 5% by weight of Silene EF (a proprietary product, being a white, extremely finely divided, precipitated, hydrated calcium silicate), 1% by weight of Darvan No. 1 (a proprietary product, being the sodium salt of polymerized polyaryl sulfonic acids) and 2% by weight of sodium dodecyl benzene sulfonate. Another satisfactory type of wettable powder contains 65% by weight of ferric nitroso dimethyl dithiocarbamate (containing the amounts of tetramethyl thiuramdisulfide specified above), 22% by weight of clay, 5% by weight of Silene EF (a proprietary product, being a white, extremely finely divided, precipitated, hydrated calcium silicate), 2% by weight of Darvan No. 1 (a proprietary product, being the sodium salt of polymerized polyaryl sulfonic acids), 5% by weight of sodium bicarbonate and 1% by weight of sodium dodecyl benzene sulfonate. Such wettable powders are dispersed in water in the amount of one or two pounds of the powder per 100 gallons of water to provide sprays which can be used for preventing blue mold on tobacco, scab on apples, anthracnose or black leaf spot on roses, rust on beans and for other purposes. The spray can be applied every week or two, depending upon weather and disease conditions.

If desired, the compound of my invention can also be used in the form of a dust. Thus, the ferric nitroso dimethyl dithiocarbamate (plus tetramethyl thiuramdisulfide) can be mixed with clay or talc to provide a mixture containing 5% by weight of active ingredient and this mixture can be applied as a dust to plants to control diseases as described above.

My composition can also be used as a seed treating chemical. For example, corn seed can be mixed with an aqueous slurry of ferric nitroso dimethyl dithiocarbamate, from 2 to 4 ounces of ferric nitroso dimethyl dithiocarbamate, 6 ounces of water and one bushel of seed being used.

It is not essential that the compound of my invention be prepared precisely as described in the examples. Essentially, the fungicide is prepared by reacting in an aqueous solution containing nitric oxide (formed in Example I from the sodium nitrite and sulfuric acid), preferably in some excess, approximately chemically equivalent amounts of a water-soluble dimethyl dithiocarbamate and a water-soluble ferrous salt. Thus, in place of the sodium dimethyl dithiocarbamate there can be used potassium dimethyl dithiocarbamate or other water-soluble salts of dimethyl dithiocarbamic acid and in place of the ferrous sulfate there can be used ferrous ammonium sulfate or ferrous chloride.

I claim:

1. The method of combating fungus attack on vegetation which comprises applying to such vegetation ferric nitroso dimethyl dithiocarbamate of the formula

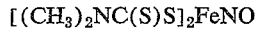

containing at least about 5% and not more than 30% by weight of tetramethyl thiuramdisulfide based on the ferric nitroso dimethyl dithiocarbamate.

2. The method of claim 1 wherein the amount of tetramethyl thiuramdisulfide is in the approximate range 5 to 20%, said tetramethyl thiuramdisulfide being formed in situ during the preparation of the ferric nitroso dimethyl dithiocarbamate.

3. The process of claim 2 wherein the amount of tetramethyl thiuramdisulfide is in the approximate range 5 to 15%.

References Cited in the file of this patent

UNITED STATES PATENTS

| | | |
|---|---|---|
| 1,972,961 | Tisdale | Sept. 11, 1945 |
| 2,614,959 | Somerville | Oct. 21, 1952 |

OTHER REFERENCES

Frear: Chemistry of Insecticides, Fungicides and Herbicides 2nd ed., 1948, pp. 266–267.